United States Patent [19]

Chiari et al.

[11] Patent Number: 5,796,051
[45] Date of Patent: Aug. 18, 1998

[54] PROCESS FOR IN-LINE CAPSULE CHECK WEIGHING AND THE APPARATUS WHICH ALLOWS THE PROCESS TO BE IMPLEMENTED

[75] Inventors: Franco Chiari, Bologna; Bruno Zanarini, San Lazzaro ei Savena, both of Italy

[73] Assignee: Macofar S.p.A., Bologna, Italy

[21] Appl. No.: 456,311

[22] Filed: Jun. 1, 1995

[30] Foreign Application Priority Data

Jun. 2, 1994 [IT] Italy .................. BO94A0261
Jun. 6, 1994 [IT] Italy .................. BO94A0265

[51] Int. Cl.$^6$ .................. G01G 19/40; G01G 19/00; B07C 5/16
[52] U.S. Cl. .................. 177/17; 177/50; 177/119; 177/145; 209/592; 209/912
[58] Field of Search .................. 177/17, 45, 50, 177/52, 54, 58, 83, 98, 119, 145, 161, 1; 73/1 B, 1.13; 364/567, 571.01, 571.05; 209/592, 912

[56] References Cited

U.S. PATENT DOCUMENTS

| | | |
|---|---|---|
| 4,106,628 | 8/1978 | Warkentin et al. .................. 177/145 |
| 4,191,294 | 3/1980 | McGrath, Jr. et al. .................. 209/592 X |
| 4,223,751 | 9/1980 | Ayers et al. .................. 177/210 C |
| 4,413,556 | 11/1983 | Ackley .................. 198/416 X |
| 4,418,772 | 12/1983 | Fukuda .................. 177/1 |
| 4,640,376 | 2/1987 | Hinzpeter .................. 177/50 |
| 4,649,494 | 3/1987 | Rosas .................. 177/50 X |
| 4,884,463 | 12/1989 | Kay .................. 73/865.8 |
| 5,135,113 | 8/1992 | Mayer et al. .................. 209/539 |
| 5,321,634 | 6/1994 | Obata et al. .................. 177/50 X |

FOREIGN PATENT DOCUMENTS

| | | |
|---|---|---|
| 0 181 946 | 5/1986 | European Pat. Off. . |
| 25 02 098 | 8/1975 | Germany . |
| WO 87/00621 | 1/1987 | WIPO . |

*Primary Examiner*—Michael L. Gellner
*Assistant Examiner*—Randy W. Gibson
*Attorney, Agent, or Firm*—Oblon, Spivak, McClelland, Maier & Neustadt, P.C.

[57] ABSTRACT

A process and apparatus for in-line capsule check weighing envisages that the capsules to be weighed be fed to a device which separates them and feeds them over a transfer surface. The capsules are positioned over the transfer surface so that their longitudinal axes are horizontal and transversal to the direction of feed and are fed to the checkweigher pans, which have seats in the transfer surface and are attached to checkweigher transducers. The weight reading for the capsules and of the relative pans is obtained at the moment in which the capsules come to rest on the pans. Finally, the weight of the pans is determined after the capsules have been moved away, so that the net weight of the capsules may be calculated.

12 Claims, 7 Drawing Sheets

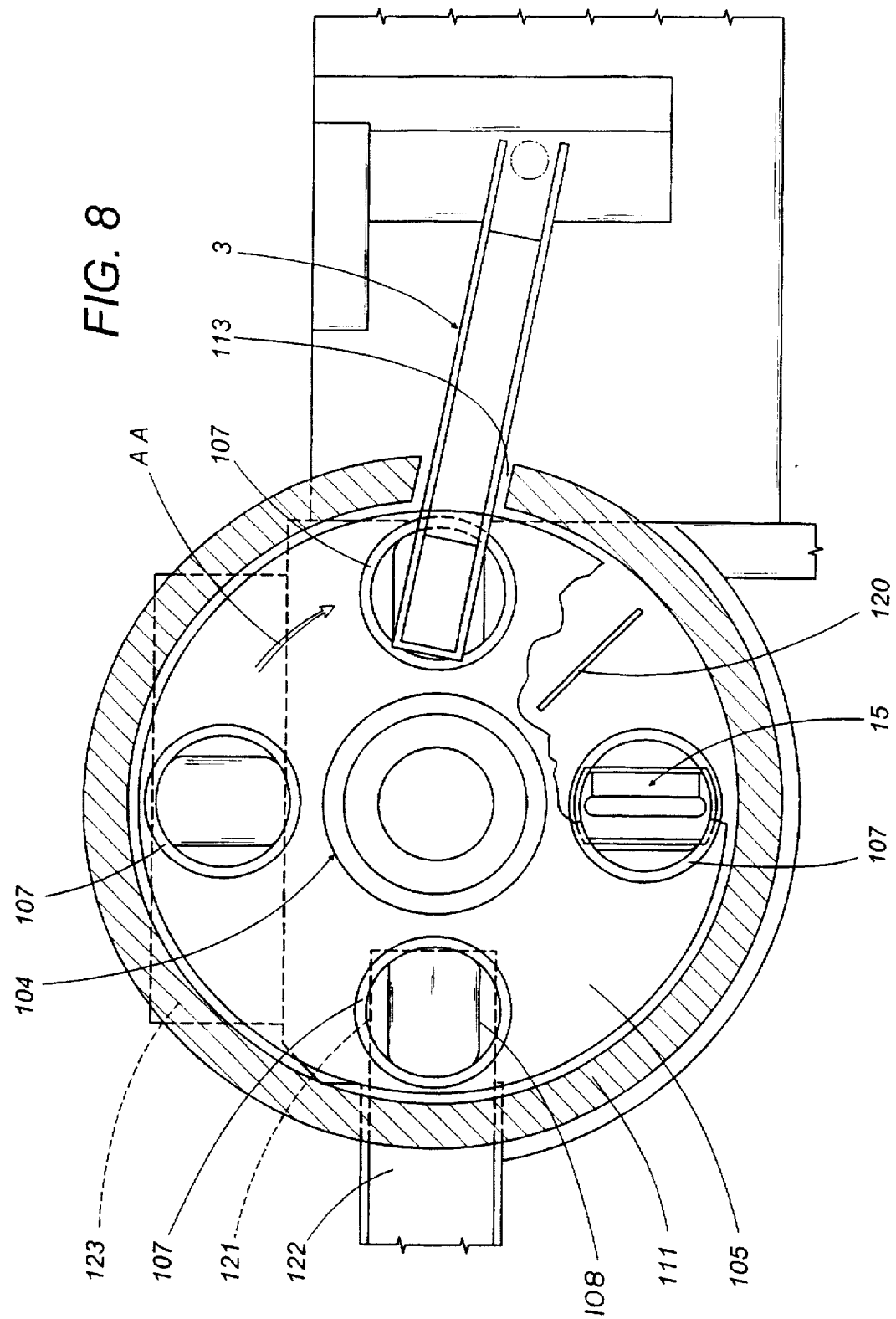

5,796,051

PROCESS FOR IN-LINE CAPSULE CHECK WEIGHING AND THE APPARATUS WHICH ALLOWS THE PROCESS TO BE IMPLEMENTED

BACKGROUND OF THE INVENTION

1. Field of the Invention

The present invention aims to provide a process for in-line capsule check weighing and the apparatus which allows the process to be implemented. The use of capsules to contain powders and similar substances is a well-known practice, particularly in the pharmaceuticals sector. The capsules are filled with a measured quantity of the product, so that the effective correspondence of the weight of the capsule with the pre-established value must be checked. In particular, in the afore-mentioned sector, for obvious reasons, such a check must be applied to all capsules produced, so that they contain a quantity of product (measured according to its weight) which remains strictly within the required limits.

2. Discussion of the Background

At present, check weighing is carried out using an apparatus which functions in various ways and is generally independent of the production line, that is to say, the capsules are weighed in machines designed specifically for that purpose, independent of the capsule filling machines, which eliminate those capsules whose weight lies outside the pre-established range. Such apparatus, therefore, requires the presence of skilled operators, involving a significant increase in costs, and such systems do not allow the immediate adjustment of any production line machinery operating with defective doses. Weight measurements are normally taken using suitable transducers such as load cells. The main problem involved in taking measurements is how to obtain a suitable degree of precision, without accounting for factors which give rise to variations in the measurement itself, in particular temperature, humidity and weight variations in the weighing apparatus, which may be caused, for example, by the presence of dirt.

Another problem identified is the fact that the passage of the capsules over the weight transducer apparatus causes oscillations which compromise the precision of the measurement.

This necessitates the use of electronic control systems for more complex measurements, which are, in proportion, much more expensive.

SUMMARY OF THE INVENTION

The aim of the present invention is to resolve the aforementioned disadvantage, devising a process which allows in-line check weighing of pharmaceutical and similar capsules, guaranteeing in particular the precision of the measurement.

A further aim of the present invention is to provide an apparatus able to implement said process, having a simple design, and being both reliable and versatile.

The said aims are both attained, in accordance with the present invention, by the present process for in-line capsule check weighing, characterized by the fact that it envisages that the capsules are fed to a device which separates them and feeds them to a transfer surface; that the capsules are positioned over the transfer surface so that their longitudinal axes are horizontal and transversal to the direction of feed; and are fed to the checkweigher pans, which have seats in said transfer surface and are attached to checkweigher transducers; that the weight reading for the capsules and of the relative pans is obtained at the moment in which the capsules come to rest on the pans; the weight of the pans is determined after the capsules have been moved away, so that the net weight of the capsules may be calculated.

BRIEF DESCRIPTION OF THE DRAWINGS

The features of the present invention will now be described in detail with reference to the accompanying drawings which illustrate a preferred embodiment of the apparatus for the in-line check weighing of capsules, by way of example only and in which:

FIGS. 6, 7 and 8 show an alternative embodiment of the present invention to that illustrated in the previous figures.

DESCRIPTION OF THE PREFERRED EMBODIMENTS

Figure 1:
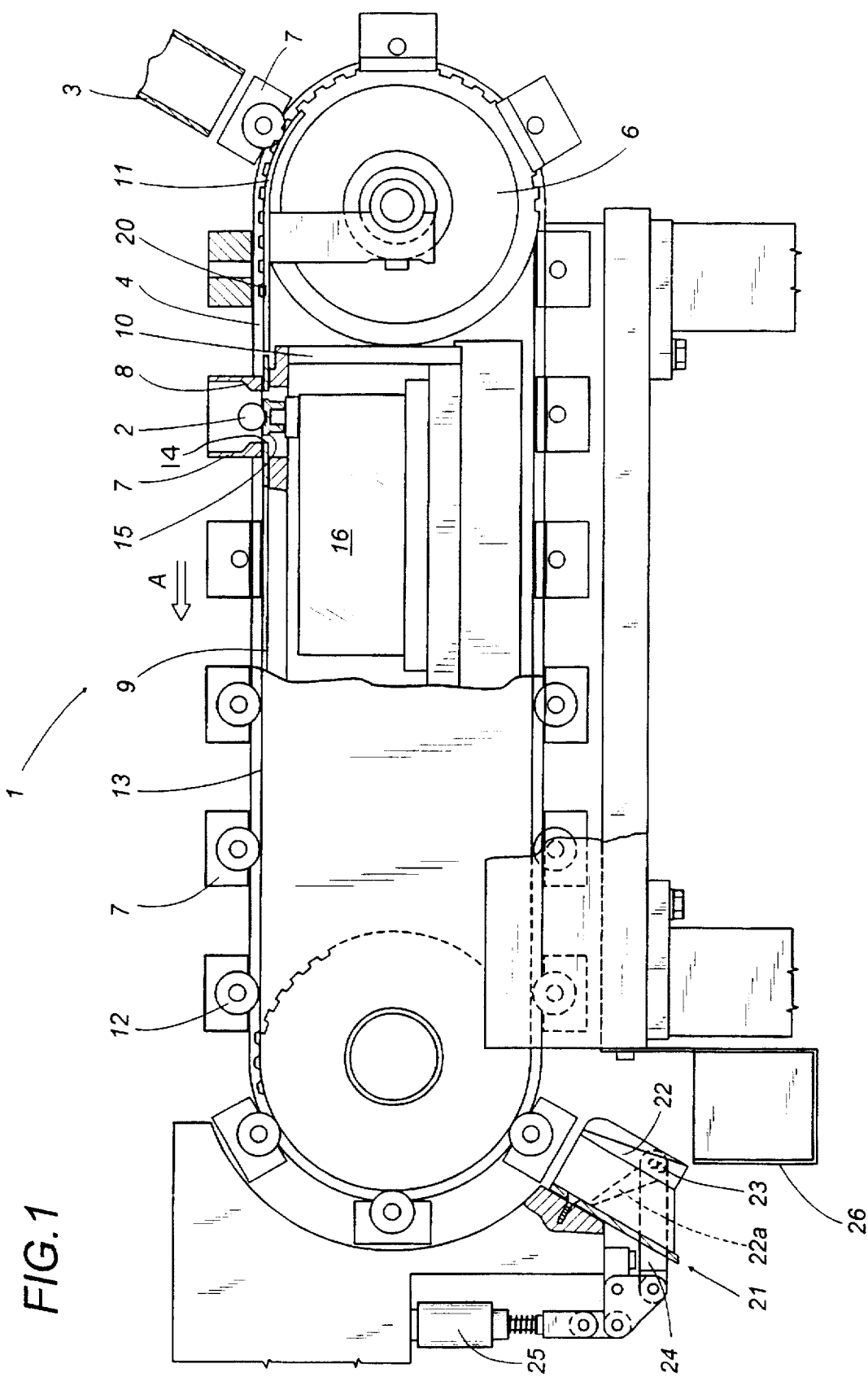
FIG. 1 is a longitudinal section, along two parallel planes, of the present invention.
Figure 2:
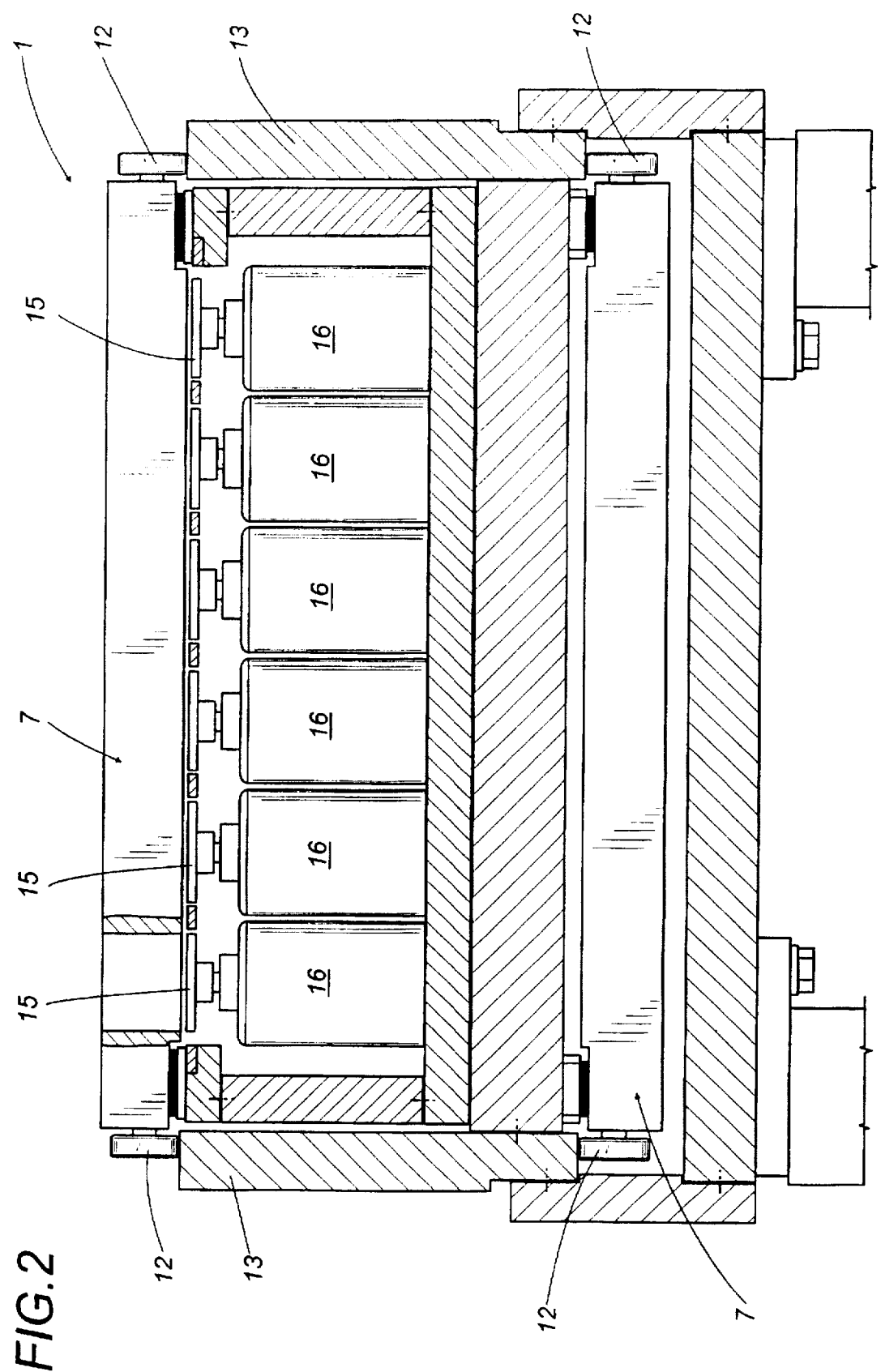
FIG. 2 is a transversal cross-section, at the weighing zone.
Figure 3:
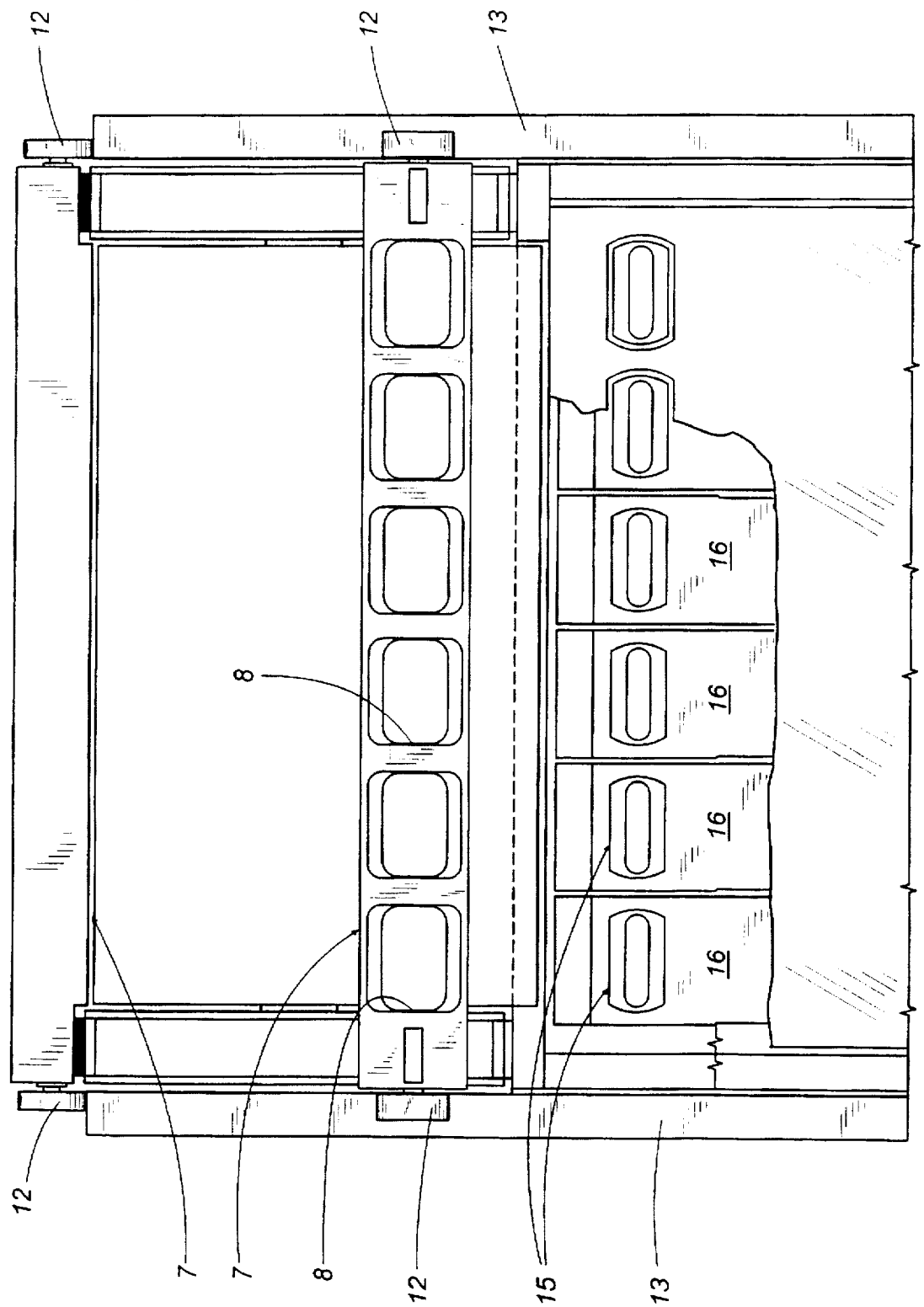
FIG. 3 is corresponding plan view.

With reference to FIGS. 1–5, numeral 1 indicates the apparatus for the in-line check weighing of capsules 2, fed from the production line by a conveyor 3.

The apparatus 1 envisages a conveyor which consists of a pair of toothed belts 4 set side-by-side, which are wound over relative pairs of pulleys 5 and 6 (front and rear); the conveyor is driven by a motor which is not illustrated, with stepping motion. The belts 4 bear a series of fixed, evenly spaced transversal bars 7, designed to separate the capsules.

For this purpose, the bars 7 have a series of slots 8 which extend longitudinally to the bars themselves and narrow suitably towards the base. A capsule 2 enters each slot 8 as the bars 7 pass below the conveyor 3. The bars 7 are designed to feed the capsules in the slots 8 onto a transfer surface 9 defined by a plate which extends horizontally in correspondence with the upper section of the belt 4; the transfer surface 9 being secured to the fixed frame 10 of the apparatus. The front and back ends of the transfer surface 9 extend with sections 11, partially curved in accordance with the curvature of the pulleys 5 and 6.

On each end of the bars 7 are rollers 12, attached in such a way that they may turn freely and be guided along the relative edges 13 of the transfer unit, secured to the frame 10.

The front of the transfer surface 9 has a transversal gap 14, designed to house a series of checkweigher pans 15 which receive the capsules 2; the pans 15 are connected to weighing transducers 16, such as load cells. Each pan 15 is aligned with a slot 8 in the transfer bar 7.

Figure 4:
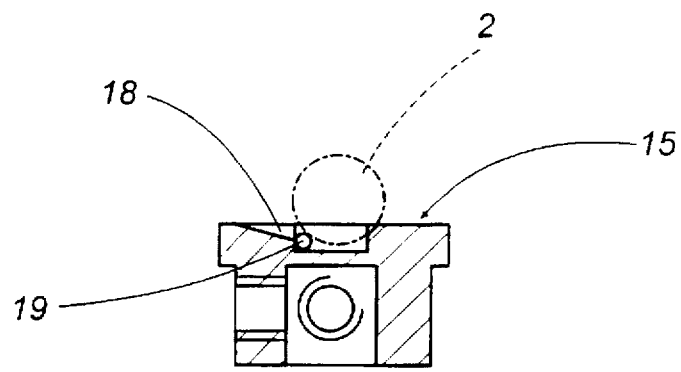
FIG. 4 is a detailed cross-section of a checkweigher pan.
Figure 5:
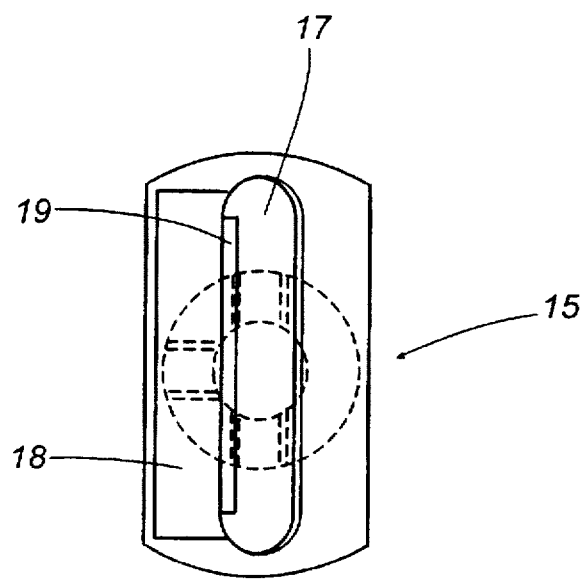
FIG. 5 is a corresponding plan view.

As shown in FIGS. 4 and 5, the top of each pan 15, preferably made of stainless steel, has a cavity 17 which extends in a direction longitudinal to the bar 7 and is designed to hold the capsule 2 during the weighing operation. One side of the cavity 17 gives onto a sloping surface 18 down which the capsule slides; said sloping surface 18 ending with a lip 19, designed to hold the capsule during the aforementioned weighing operation.

Upstream of the gap 14 which houses the pans 15, in the direction of feed A of the bars 7, the transfer surface has a transversal groove 20, designed to position the capsule so that its longitudinal axis is horizontal and transversal to the direction of feed. The same result could be achieved in other ways, for example, with transversal ribbing on the transfer surface.

A sorter for the separation of rejects, indicated by the numeral 21, is envisaged at the front end of the belt 4.

The device has a diverter 22 which moves about a horizontal axis 23 when a system of levers 24 controlled by an actuator 25 is operated. When it is in the normal position, the diverter 22 allows the capsules which leave the slots 8 in the transfer bars 7 to be transferred to suitable means which move them away, and which are not illustrated; however, when a faulty capsule is detected, the movement of the diverter 22 to the position indicated with a broken line 22a (FIG. 1) causes the said capsule to be unloaded into a rejects container 26.

A sorter of the type illustrated is, obviously, envisaged in correspondence with each of the slots 8 in the transfer bars 7.

The process for in-line capsule 2 check weighing envisages, as already said, the alignment of the capsules within slots 8 in the transfer bars 7, moved with stepping motion by the belt 4 in the direction of feed A. The bars 7 separate the individual capsules and move them onto the transfer surface 9; when they arrive at the groove 20, the capsules are positioned with their longitudinal axes horizontal and transversal to the direction of feed.

The capsules thus positioned are fed to the relative checkweigher pans 15 housed in the transfer surface 9 and connected to weighing transducers 16; the capsules pass over the sloping surface 18 of the checkweigher pans 15 and into the cavities 17 of the pans, being held in place by the lip 19.

The overall weight of the capsule and the checkweigher pan 15 is measured at the moment in which the capsule comes to rest on the said checkweigher pan.

It should be noticed that the feed step of the belt 4 is equivalent to the distance between the bars 7, so that with each step the bars 7 stop in succession over the checkweigher pans 15 for a period sufficient for completion of the weighing operation.

Following the first weighing operation, the forward motion of the bars 7 causes the capsules weighed on the pans 15 to move away, so that the weight of the pans themselves may be ascertained and the weighing transducers be zeroed. This calibration obviously allows the net weight of the capsules to be determined with considerable precision. The measurement thus obtained does not account for factors which may cause a variation in the measurement, such as temperature, humidity and variations in the weight of the weighing apparatus caused, for example, by the presence of powder on the surface of the load cell. It should also be noticed that, as the capsules are moved forwards within the slots 8 of the bars 7, they roll over the transfer surface 9, allowing the entire external surface of each capsule to be examined and thus revealing any faults, for example using a telecamera or similar means. This allows any faulty capsules to be rejected.

The fact that the capsules remain still on the checkweigher pan contributes to the precision of the weight measurement, since no oscillations are caused on the weighing transducers.

Particularly worthy of notice is the fact that the capsules are fed with their longitudinal axes horizontal and transversal to the direction of feed, and in such a way that each capsule remains at a suitable distance from the next. Moreover, the rolling feed motion of the capsules avoids problems such as sliding, which could damage them.

In this way, from the moment in which the weighed capsules leave the checkweigher pans to the moment in which the next capsules enter them, there is enough time for the said second measurement and zeroing of the weighing transducers.

Both the weighing stage and the transducer calibration stage are effected while the signal detected by the transducers is stable, and not during the transients in which the signal oscillates.

This makes the measuring operation extremely simple, and does not necessitate the use of electronic data management means.

The capsules leaving the checkweigher pans 15 are again moved forwards over the transfer surface 9, within the slots 8 in the bar 7, until they arrive at the unloading zone, equipped with sorters 21 which automatically reject those capsules whose weight lies outside the pre-established limits.

Moreover, when the production line stops, the operating cycle illustrated continues until all remaining capsules are emptied from the apparatus.

Figure 6:
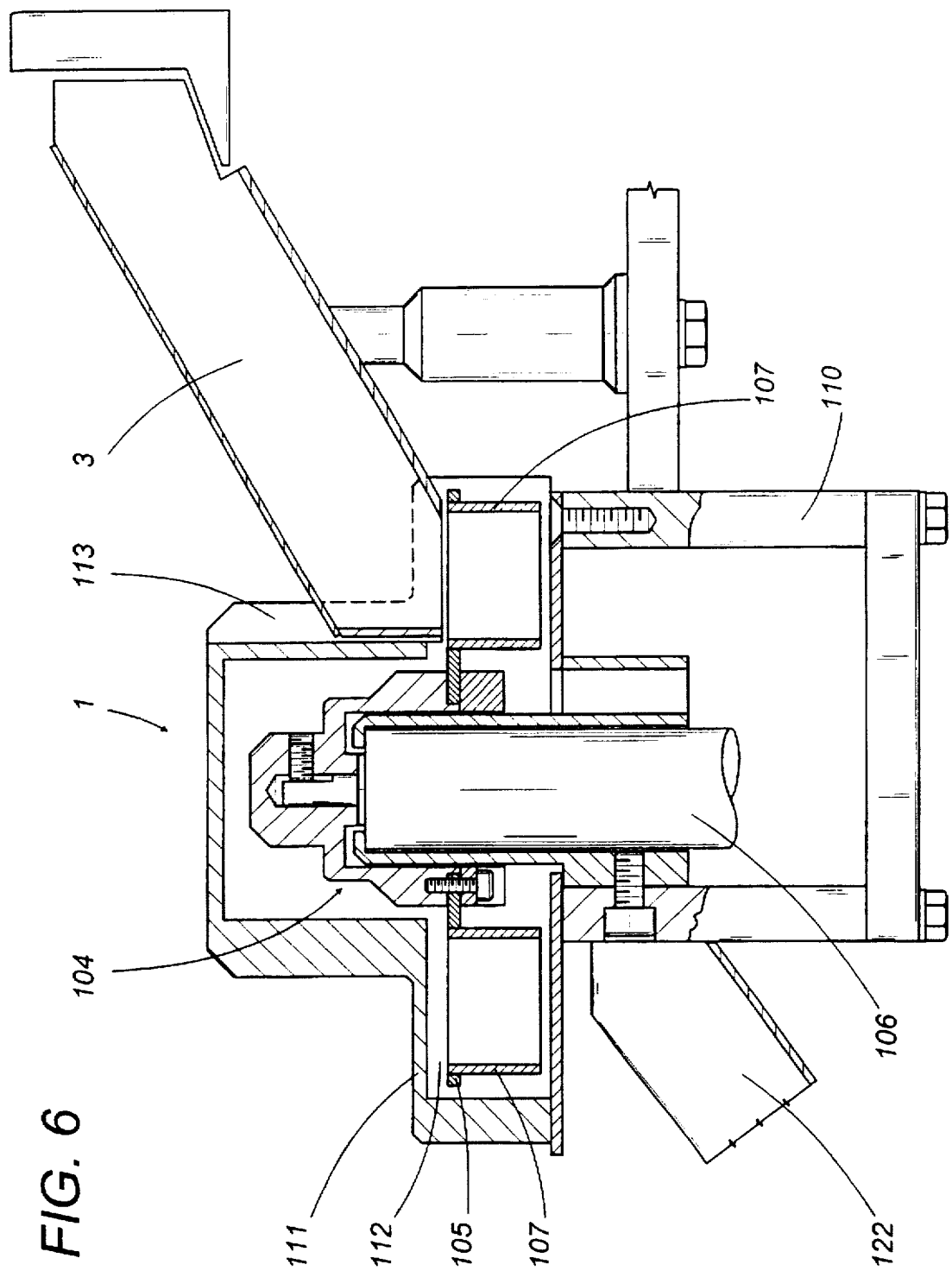
Figure 7:
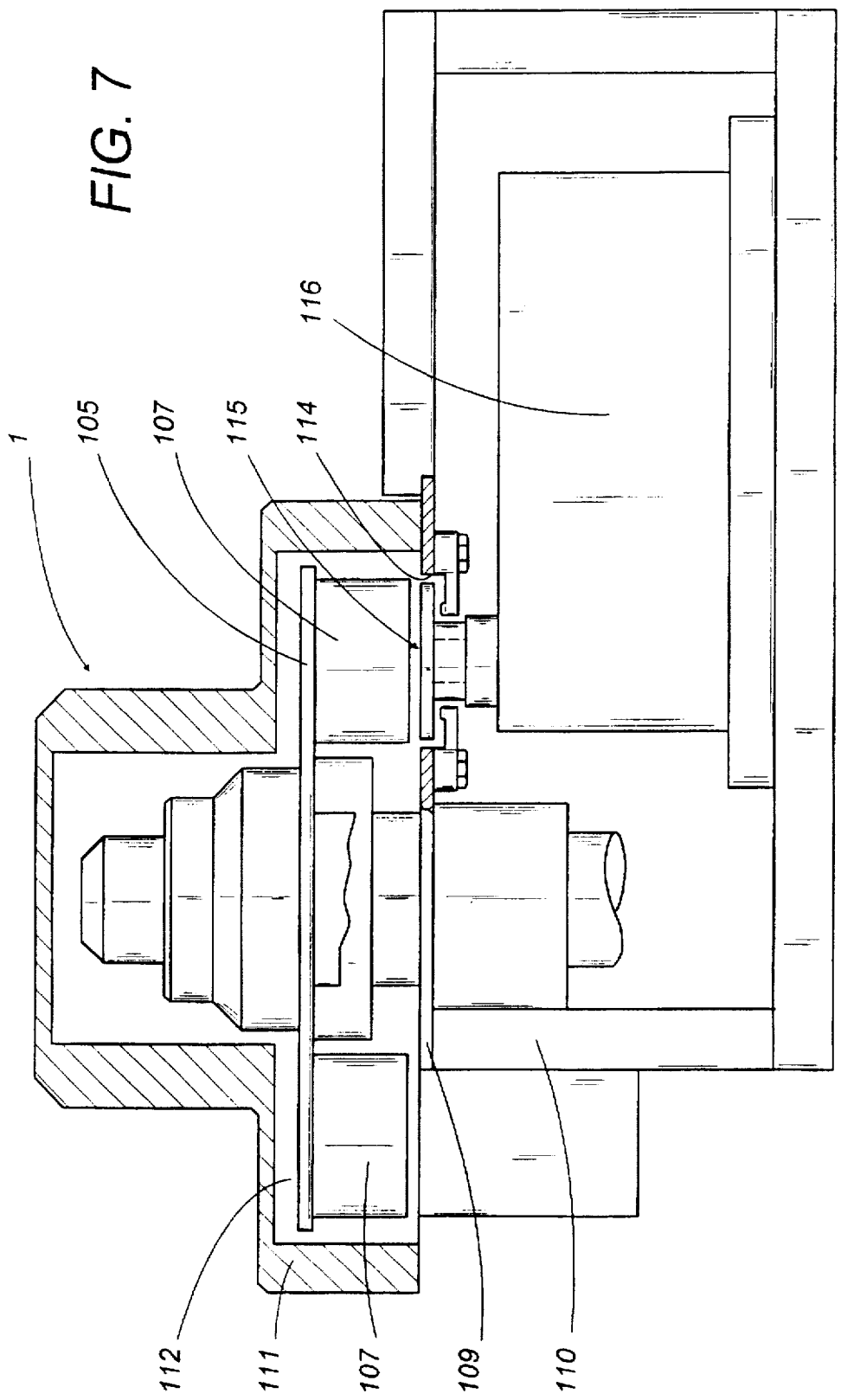

Reference shall now be made to FIGS. 6, 7 and 8, which illustrate an alternative embodiment of the apparatus for the present invention, again using the process described above. In this case, the apparatus 1 has a star wheel 104, which rotates about a vertical axis.

The star wheel 104 consists of a wheel 105, axially attached to a shaft 106 and driven by a stepping motor, not illustrated. The wheel 105 has a series of evenly spaced circular apertures, housing bushes 107, which separate the capsules. For this purpose the bushes 107 define respective slots 108 (see FIG. 8) which extend outwards radially on the star wheel 104. A single capsule 2 enters each slot 108 as the bush 107 passes beneath the conveyor 3. For example, the wheel 105 may have four bushes 107, evenly spaced (at 90° from one another); the feed step of the star wheel 104 coincides with the distance defined by the angle between the bushes 107. The bushes 107 move the capsules held in the slots 108 forwards over a transfer surface 109 defined by a plate which extends so that it is horizontal and concentric with the star wheel; the transfer surface 109 is secured to the fixed frame 110 of the apparatus.

Fixed above the transfer surface 109 is a bell-shaped cover 111; the cover 111 defines a cylindrical chamber 112 which houses the rotary wheel 105 with its bushes 107. The cover 111 has a radial opening through which the conveyor 3 passes.

Downstream of the station for reception of the capsules from the conveyor 3, the transfer surface 109 has an opening 114 designed to house a checkweigher pan 115 which is to receive the capsule to be weighed; the pan 115 is attached to a weighing transducer 116, or load cell. During the weighing operation, the pan 115 is aligned with one of the star wheel bushes 107.

Upstream of the opening 114 which houses the pans 115, in the direction of feed AA of the star wheel, the transfer surface 109 has a groove 120, designed to position the capsule so that its longitudinal axis is radial to the star wheel. The same result could be achieved in other ways, for example, with radial ribbing on the transfer surface.

Downstream of the checkweigher pan 115, the transfer surface 109 has an opening 121 through which the capsules are unloaded into a tube 122 which moves them away. Located at this opening, is a suitable device for separating rejects, not illustrated. This sorter has a diverter which moves between a position which allows the capsule leaving the bush 107 to be conveyed to the tube 122, and a position in which it closes the opening 121, thus blocking the faulty capsule in the bush 107. In the latter case, the subsequent forward motion of the star wheel leads the faulty capsule to be unloaded into a container 123 downstream of the tube 122.

In its normal position, said diverter, therefore, allows the capsule leaving the bush 107 slot 108 to be conveyed to the tube 122; however, when a faulty capsule is detected, the diverter moves into the closed position, so that the faulty capsule is subsequently unloaded into a container 123.

The operation of the apparatus in accordance with this alternative embodiment is easily understood from the description which refers to the embodiment illustrated in FIGS. 1 to 5. It should be noticed that, even in this case, the feed step of the star wheel 104 is equivalent to the distance defined by the angle between the bushes 107, so that with each step the bushes 107 stop in succession over the checkweigher pan 115.

The process and apparatus described in accordance with the present invention, therefore, allow the simple in-line check weighing of pharmaceutical and similar capsules, guaranteeing a precision weight measurement.

The apparatus is made so that it may be integrated in the production line, and does not require the presence of operators during normal operation.

The apparatus allows high production levels to be reached by working in parallel on a series of capsules.

Moreover, thanks to its simple operation and construction, the apparatus is relatively inexpensive and requires little maintenance.

In practice, the materials used in the construction of the present invention, as well as the shape and size, may be adapted to suit all requirements.

What is claimed:

1. A method for in-line capsule check weighing, which comprises:

feeding capsules to be weighed to a device;

separating and feeding the capsules over a transfer surface via said device;

positioning said capsules so that the longitudinal axes of said capsules are horizontal and transversal to the direction of feeding of the capsules over said transfer surface;

feeding the capsules thus positioned to checkweigher pans housed in the transfer surface and respectively connected to weighing transducers; and measuring the weight of the capsules and pans at the moment which the capsules come to rest on the pans; the weight of the pans being measured after the capsules have been moved away, so as to allow the calculation of the net weight of the capsules.

2. The method as claimed in claim 1, which comprises rolling the capsules over said transfer surface as the capsules are moved forwards by the said device so that the entire external surface of the capsules is visible.

3. The method as claimed in claim 1, wherein the feeding of the capsules to the checkweigher pans comprises feeding the capsules thus positioned to stationary checkweigher pans housed in the transfer surface and connected to the weighing transducers.

4. The method as claimed in claim 3, wherein the measuring of the weight of the capsules and stationary pans occurs at the moment in which the capsules come to rest on the stationary pans.

5. The method as claimed in claim 3, wherein the measuring of the weight of the stationary pans occurs after the capsules have been moved away, so as to allow the calculation of the net weight of the capsules.

6. The apparatus as claimed in claim 5, wherein said check weighing pans comprise stationary check weighing pans.

7. Apparatus for in-line capsule check weighing, which comprises:

a device separating the capsules to be weighed and moving the capsules forward over a transfer surface;

a positioning mechanism positioning the capsules so that the longitudinal axes of the capsules are horizontal and transverse to the direction of feeding of the capsules over said transfer surface; and at least one checkweigher pan which is housed in said transfer surface and connected to a weighing transducer, said at least one pan measuring the net weight of each of the capsules fed to said at least one pan in succession, wherein said device separating the capsules comprises at least one bar positioned so as to be transversal to the direction of feeding of the capsules, said device having a series of slots which extend in a direction longitudinal to the bar, each of said slots being positioned so as to receive one of the capsules to be weighed, and a driving mechanism driving said bar with a stepping motion above the transfer surface.

8. The apparatus as claimed in claim 7, wherein said mechanism positioning the capsules comprises a groove which lies transversal to said transfer surface.

9. The apparatus as described in claim 7, wherein downstream of said checkweigher pan, the transfer surface has an opening forward therein through which capsules that have been weighed are unloaded into a tube so as to be moved away, and which comprises a reject separating device located at the opening, said separating device including a diverter which is movable between a position allowing the capsules to be conveyed to the tube, and a position which closes the opening so as to block any faulty capsule of the capsules on said transfer surface from passing to a collection station located downstream thereof.

10. Apparatus for in-line capsule check weighing, which comprises:

a device separating the capsules to be weighed and moving the capsules forward over a transfer surface;

a positioning mechanism positioning the capsules so that the longitudinal axes of the capsules are horizontal and transverse to the direction of feeding of the capsules over said transfer surface; and at least one checkweigher pan which is housed in said transfer surface and connected to a weighing transducer, said at least one pan measuring the net weight of each of the capsules fed to said at least one pan in succession, wherein a top portion of said checkweigher pan has a cavity formed therein which extends transversely to the direction of feeding of the capsules and which holds one of the capsules to be weighed, one side of said cavity opening onto a sloping surface down which the capsule slides, the sloping surface ending in a lip which holds the capsule during the weighing operation.

11. The apparatus as claimed in claim 7 or 10, wherein said separating device comprises a rotary conveyor and said positioning mechanism positions the capsules so that the longitudinal axes thereof are horizontally and radially oriented with respect to said rotary conveyor, transversal to the direction of feeding of the capsules on the transfer surface.

12. The apparatus as claimed in claim 11, wherein said rotary conveyor comprises a star wheel which is rotatable about a vertical axis and has a series of evenly spaced circular apertures formed therein, respectively housing bushes therein, and which comprise the capsule separating device.

* * * * *